US012575493B2

(12) United States Patent　　　　　(10) Patent No.:　US 12,575,493 B2
Corban et al.　　　　　　　　　　　(45) Date of Patent:　　Mar. 17, 2026

(54) SYSTEM AND METHOD FOR CONTROLLING MACHINE BASED ON COST OF HARVEST

(71) Applicant: DEERE & COMPANY, Moline, IL (US)

(72) Inventors: Stephen R. Corban, Geneseo, IL (US); Mario L Donini, Bettendorf, IA (US); Kent S. Brown, Sherrard, IL (US); Adam J. Donohoe, Bettendorf, IA (US)

(73) Assignee: Deere & Company, Moline, IL (US)

( * ) Notice: Subject to any disclaimer, the term of this patent is extended or adjusted under 35 U.S.C. 154(b) by 408 days.

(21) Appl. No.: 17/861,853

(22) Filed: Jul. 11, 2022

(65) Prior Publication Data

US 2024/0008401 A1　　Jan. 11, 2024

(51) Int. Cl.
A01D 41/127　　　(2006.01)

(52) U.S. Cl.
CPC ................................. A01D 41/127 (2013.01)

(58) Field of Classification Search
CPC ....... A01D 41/127; A01D 41/02; A01D 91/00
See application file for complete search history.

(56) References Cited

U.S. PATENT DOCUMENTS

2005/0150202 A1　7/2005　Quick
2015/0199630 A1*　7/2015　Pfeiffer .............. G06Q 10/0639
707/740

2018/0359919 A1*　12/2018　Blank .................... G05D 1/226
2021/0088691 A1*　3/2021　Ferren .................. G06T 7/0004
2021/0195836 A1*　7/2021　Koch ..................... G06Q 50/02

(Continued)

FOREIGN PATENT DOCUMENTS

EP　　1321024 A1　6/2003
EP　　2728523 A1　5/2014
EP　　3242257 A1　11/2017

OTHER PUBLICATIONS

AgriEngineering; Article "Harvester Evaluation Using Real-Time Kinematic GNSS and Hiring Service Model", Citation: Md. Kamrul Hasan, Takashi S.T. Tanaka, Md. Rostom Ali, Chayan Kumer Saha, Md Monjurul Alam.; Published: Jun. 6, 2021; pp. 1-20; https://doi.org/10.3390/agriengineering3020024.

(Continued)

*Primary Examiner* — James M McPherson
*Assistant Examiner* — Bakari Underwood
(74) *Attorney, Agent, or Firm* — Taft Stettinius & Hollister LLP; Stephen F. Rost

(57)　　　　　　　ABSTRACT
A control system of an agricultural machine for performing a harvest operation includes a controller having a memory unit and a processor. The control system also includes a fuel sensor, a grain loss sensor and at least one user control of a plurality of user controls disposed in communication with the controller. The memory unit includes a plurality of instructions stored thereon that, in response to execution by the processor, causes the control system to receive a plurality of inputs via the controller including the rate of fuel from the fuel sensor, the amount of grain loss from the grain loss sensor, and one or more preset cost values from the at least one user control, process the plurality of inputs to determine a current cost of harvest value, and output a current cost of harvest value during the harvest operation.

20 Claims, 3 Drawing Sheets

(56)                    References Cited

U.S. PATENT DOCUMENTS

2022/0067121 A1 *   3/2022  Huber .................. A01B 79/005
2022/0374912 A1 *  11/2022  Zeng .................... G06Q 30/018

OTHER PUBLICATIONS

Intstitute of Technology, Estonian University of Life Sciences, Tartu, Estonia; Research in Agricultural Engineering, 65, 2019 (1): 25-32; Publication "Assessment of the Harvesting Costs of Different Combine Harvester Fleets"; https://doi.org/10.17221/98/2017-RAE; pp. 1-8; Citation: Olt J., Juut K., Ilves R., Juut A.

Professor and Research Associate, Department of Agricultural Economics and Agribusiness, Louisiana State University Agricultural Center, Baton Rouge, LA; Staff Report No. 2010-08 , Publication "Estimating Rice Combine Harvest Cost: Performance Rate, Capital Cost, Operating Cost"; Citation, Michael S. Salassu and Michael A. Deliberto! pp. 1-7; Date: Aug. 2010.

Czech University of Life Sciences Prague; Aleksandras Stulginskis University; ResearchGate Publication "Evaluation of Combine Harvester Operation Costs in Different Working Conditions"; https// www.researchgate.net/publication/317254566; Date: May 2017; Citation: J. Masek, P. Novak, Jasinskas Algirdas; pp. 1-7.

German Search Report issued in application No. 102023116084.2 dated Jan. 31, 2025, 08 pages.

W. Fechner et al., Cost model for combine ground speed selection including kernel loss, Agritechnica, Berlin (1993) H. 16, pp. 190-195.

* cited by examiner

SYSTEM AND METHOD FOR CONTROLLING MACHINE BASED ON COST OF HARVEST

FIELD OF THE DISCLOSURE

The present disclosure relates to a machine, and in particular, to a system and method for controlling the machine based on a cost of harvest.

BACKGROUND

Work machines such as combines and other agricultural machines are often controlled to achieve certain goals. In some instances, the machine is controlled for a performance or productivity goal. In other instances, the machine is controlled to meet various cost constraints. For example, work machines often can be controlled or operated at their lowest possible cost. As is known, operating costs for a work machine such as a combine or other agricultural machine can be significant.

Thus, there is a need for a system to control or operate a work machine to achieve a desired cost of harvest.

SUMMARY

In one embodiment of the present disclosure, a control system of an agricultural machine for performing a harvest operation includes a controller comprising at least one memory unit and at least one processor. A fuel sensor is disposed in communication with the controller such that the fuel sensor is configured to detect a rate of fuel being delivered to a power-generating device of the machine. A grain loss sensor is disposed in communication with the controller such that the grain loss sensor is configured to detect an amount of grain loss from the machine. At least one user control of a plurality of user controls is disposed in communication with the controller. The at least one memory unit includes a plurality of instructions stored thereon that, in response to execution by the at least one processor, causes the control system to receive a plurality of inputs via the controller including the rate of fuel from the fuel sensor, the amount of grain loss from the grain loss sensor, and one or more preset cost values from the at least one user control, process the plurality of inputs to determine a current cost of harvest value, and output a current cost of harvest value in real-time during the harvest operation.

In one example of this embodiment, an onboard display in the machine is disposed in communication with the controller, wherein the current cost of harvest value is displayed in real-time during the harvest operation on the onboard display. In another example, the controller outputs the current cost of harvest value in a digital form on the onboard display. In yet another example, the controller outputs the current cost of harvest value in a graphical format with a current cost of harvest value displayed on a curve. In a further example, at least a first color code and a second color code are provided, the first color code indicative of the cost of harvest value being in a desirable range of cost of harvest values and the second color indicative of the cost of harvest value being in an undesirable range of cost of harvest values, wherein the controller compares the current cost of harvest value to the desirable or undesirable range of cost of harvest values and the controller outputs the first color code or second color code on the onboard display.

In another example of this embodiment, as the current cost of harvest value changes to a new cost of harvest value during the harvest operation, the controller continuously outputs to the onboard display the new cost of harvest value. In yet another example, wherein the control system outputs the current cost of harvest value to a remote device. In a further example, the one or more preset cost values comprises a labor cost associated with operating the machine, a trade cost associated with a depreciation of the machine, a consumable cost associated with a consumable for the machine to operate, and a fuel cost. In yet a further example, the control system outputs the current cost of harvest value as a function of the rate of fuel from the fuel sensor, the amount of grain loss from the grain loss sensor, the labor cost, the trade cost, the fuel cost and the consumable cost.

In another example, the plurality of instructions may include a plant model configured to compare the plurality of inputs to one or more machine functions and determine a relationship between the plurality of inputs and the one or more machine functions, and an optimizer configured to receive the current cost of harvest value and the relationship from the plant model, and produce an optimal output in the form of an adjustment to the one or more machine functions to reduce the current cost of harvest value. In turn, the controller operably adjusts the one or more machine functions based on the optimal output. In a further example, the controller compares the optimal output to one or more operating constraints. In yet a further example, the controller operably adjusts one or more of machine speed, chaffer clearance, sieve clearance, cleaning fan speed, threshing speed, and threshing clearance.

In some embodiments of this disclosure, a method of operating an agricultural machine to perform a harvest operation includes providing the machine with a controller, a fuel sensor, a grain loss sensor, and a ground speed sensor; detecting via the fuel sensor a rate of fuel delivered to a power-generating device of the machine; detecting via the grain loss sensor an amount of grain loss from the machine during the harvest operation; detecting a machine ground speed via the ground speed sensor; receiving, by the controller, a plurality of input data including the rate of fuel, the amount of grain loss, the machine ground speed, a labor cost for operating the machine, a trade cost of the machine, and a consumable cost for running the machine; processing, by the controller, the plurality of input data to determine a current cost of harvest value during the harvest operation; and controlling the machine to reduce the current cost of harvest value to satisfy a cost of harvest threshold.

In one example, the controlling step comprises adjusting the machine ground speed until the current cost of harvest value satisfies the cost of harvest threshold. In another example, the method may include outputting the current cost of harvest value to an onboard display in the machine during the harvest operation. In yet another example, the method may include receiving, via the controller, an instruction to adjust a machine function to reduce the current cost of harvest value; wherein, the machine function comprises at least one of machine ground speed, chaffer clearance, sieve clearance, cleaning fan speed, threshing speed, and threshing clearance.

In a further example, the method may include receiving, via the controller, a limit on the machine function; comparing the limit on the machine function to the instruction to adjust the machine function; and operating controlling the machine function to reduce the current cost of harvest value without violating the limit.

In yet a further example, the current cost of harvest value is calculated by the controller by determining a fuel cost as a function of the rate of fuel, a grain loss cost as a function of the amount of grain loss, and a productivity value as a function of an amount of area harvested over a period of time; calculating a sum of the trade cost, labor cost, fuel cost, consumable cost, and grain loss cost; and dividing the sum by the productivity value.

In other embodiments of the present disclosure, one or more non-transitory machine-readable storage media comprising a plurality of instructions stored thereon that, in response to execution by a control system on an agricultural machine, causes the control system to receive, by the control system, a plurality of input data including a rate of fuel, an amount of grain loss, a machine ground speed, a labor cost for operating the machine, a trade cost of the machine, and a consumable cost for running the machine; processing, by the control system, the plurality of input data to determine a current cost of harvest value during the harvest operation; and adjusting one or more functions of the machine in real-time to change the current cost of harvest value to a new cost of harvest value, where the new cost of harvest value is less than the current cost of harvest value.

In one example, the one or more functions may include machine ground speed, chaffer clearance, sieve clearance, cleaning fan speed, threshing speed, or threshing clearance.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
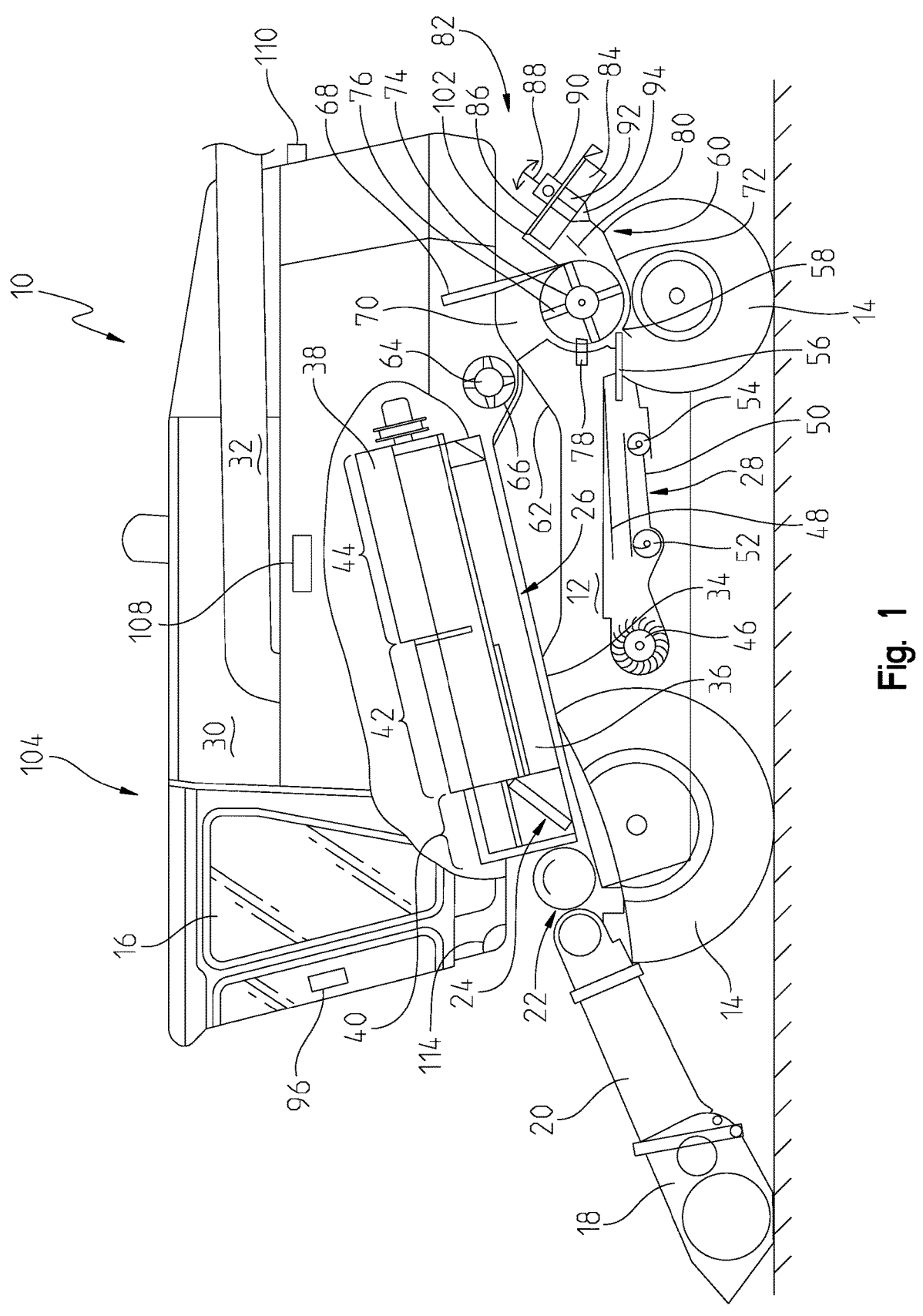
FIG. 1 is a partial section of a side view of an agricultural machine with a lighting system according to the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In the operation of an agricultural machine or vehicle such as the combine of FIG. 1, there is a cost associated with performing a harvesting operation. In some embodiments, it may be desirable to operate the machine in such a way that the cost of harvest is reduced or minimized as best as possible. However, operators of the machines may not be aware or informed in real-time of how a current function or operation of the machine is affecting the overall cost of harvest. In some embodiments, one factor may influence the cost of harvest differently than another factor. It can be advantageous to provide a notification in real-time to the operator or manager of the machine of the actual cost of harvest. This may be something that can be communicated to a dashboard or display of the machine. Alternatively, this may be advantageously communicated to a remote location such as a cell phone, laptop, or other control system remote from the machine. Currently, there lack control systems which compute a real-time cost of harvest and either communicate this value in some form to the operator or manager, or utilizes an autonomous system for controlling the machine in such that way the cost of harvest can be optimized. For purposes of this disclosure, "real-time" may refer to continual, continuous, continuously, instantaneously, simultaneously, at a present moment in time, etc. In some instances, "real-time" may include a small delay (e.g., within several seconds or less). In some embodiments, "real-time" may refer to a current or continuous condition (i.e., as the operator is operating a machine the current machine speed may be communicated to the operator at that moment in time or in real-time). The advantage of receiving information in real-time is that the operator, other party, or the machine controller can receive information in the moment and make meaningful adjustments in a short amount of time to control the operation of the machine. The present disclosure thus seeks to provide this level of communication and/or control to an agricultural machine and operating mode.

Operation costs of an agricultural machine or vehicle can be significant. Several factors can affect these operational costs including, but not limited to, depreciation of the machine, grain loss from the machine, fuel usage, and labor cost. Depreciation on the machine can be a factor of a number of hours of machine operation. If the machine operates at a higher speed in the field, for example, the number of hours of usage may decrease thus reducing cost. On the other hand, grain loss from the machine may occur regardless of machine speed. However, as the machine operates at a higher speed, there may be a higher grain loss. In a combine, for example, grain may be lost from the rear of the machine. Thus, depreciation and grain loss provide conflicting factors to the overall cost of harvest. Moreover, fuel usage or diesel exhaust fuel (DEF) usage is a consumable cost as will be described in further detail below. In any event, it can be desirable to control ground speed as well as other factors to help control the costs of operating the machine in a harvest operating mode. In one embodiment, the agricultural machine such as the machine 10 in FIG. 1 may include a sensor 114 for detecting ground speed. Beyond this level of control, it can be advantageous to communicate the cost of harvest in real-time to an operator, manager, farm owner, etc. in a numerical, scalar, or other form. It may also be desirable to communicate this information in relation to machine performance for that day, in comparison to other machines within the same fleet of machines, or relative to a benchmark score or threshold.

In the present disclosure, a system may be provided for determining a cost of harvest as a factor of cost per hour (e.g., $/hour), cost per area (e.g., $/hectare), or cost per crop mass (e.g., $/bushel, $/ton, etc.). This information may be determined or calculated by a control system including a controller located on the machine or remote from the machine. In FIG. 1, the machine 10 may include one or more controllers 108 for controlling the machine 10. The information may be displayed in the cab of the machine to an operator in the form of a numerical value, scalar value, etc. In one embodiment, the system for determining the real-time cost of harvest may do so via an algorithm such as the example below:

$$\text{Cost of Harvest} = \frac{\substack{\text{Trade Cost} + \text{Labor Cost} + \text{Fuel Cost} + \text{Comsumable Cost} + \\ \text{Grain Cost} + \text{Grain Dockage Cost}}}{\text{Productivity}}$$

In this algorithm, the control system may evaluate a number of factors or parameters which affect the cost of harvest. These factors may include trade cost, labor cost, fuel cost, consumable cost, grain cost, grain dockage cost, and productivity. One or more of these factors may be input via an operator, manager, machine owner, farm owner, etc. Moreover, one or more of these factors may be calculated by one or more controllers of the control system. Further, one or more of these factors may be detected by a sensor or other sensing device on the machine. In any event, these factors may be inputs to the cost of harvest determination made by the control system.

In one embodiment, the control system may consider a factor such as trade cost. Trade cost may be defined in terms of cost per unit of time such as dollars ($) per hour. Trade cost may also be referred to as depreciation, i.e., how much will it cost to trade the machine in view of how many hours were accumulated on the machine during use. For example, the trade cost may be determined based on a difference between purchase price and trade-in value, and the difference divided by the number of hours accumulated on the machine. So, if the purchase price was $400,000, the trade-in value is $100,000 and the machine has 1000 hours on it, the trade cost may be approximately $300/hour. The more acreage the machine is able to cover during harvest will result in a better total cost per acre of harvest. In one embodiment, the trade cost may be an input which an operator, manager, owner or other third party inputs into the system. In another embodiment, the system may calculate this value from one or more inputs or factors.

Trade cost may be one of several factors that make up machine operating cost. Operating cost may also include labor cost. In one example, labor cost may be a cost of operating the machine such as from a hired party or a machine owner running the machine. This factor considers how it is best to operate the machine in a cost effective manner. The cost of labor may be input into the system by the operator, manager, owner or other third party such as the machine manufacturer or distributor.

Another factor considered in the cost of harvest is fuel cost. The fuel cost may be calculated on the machine by a controller in terms of an amount of fuel used by the machine over a given period of time. In one embodiment, a sensor on the machine may sense or determine an integrated flow rate of fuel being delivered to the engine, for example. The flow rate may be determined, for example, as a function of volume of fuel per unit time (e.g., mass of product per hour). The cost of fuel in dollars per unit volume (e.g., dollars per gallon) may then be multiplied by the flow rate to determine the fuel cost in a unit of cost per a unit of time value (e.g., dollars per hour). From this, the controller may determine in real-time the fuel usage of the machine.

In another embodiment, the cost of harvest may consider a factor referred to as a consumable cost. The consumable cost may be a secondary consideration in some instances. It may include a diesel exhaust fuel (DEF) rate in a per unit of time value. The DEF rate may be a fuel or consumable that the machine consumes to allow it to run as desired. In one embodiment, an operator, manager machine owner, farm owner, or other third party may input a value for this factor into the system. Alternatively, the system may be able to calculate this value from one or more variables. Moreover, a DEF sensor may detect the DEF rate consumption and communicate the consumption value to a controller.

In a further embodiment, the control system may determine the real-time cost of harvest by also considering a factor known as grain loss or grain loss cost. Grain loss may be configured in terms of bushels or tons per acre. As noted above, grain loss is factored as a loss of grain from the machine during harvest. As the machine increases speed and productivity, grain loss may also increase. In one embodiment, one or more sensors may be provided towards a rear of the agricultural machine. For instance, the one or more sensors may be located adjacent to or near the blower 82 of the machine 10 in FIG. 1. This location is only provided as an example and the one or more sensors may be located elsewhere. Nevertheless, as the machine is performing a harvesting operation, the one or more sensors may detect when a grain kernel strikes the sensor or other mechanism to which the sensor is coupled or is located adjacent to. The one or more sensors may be in communication with a controller 108, for example, to communicate the number of kernel strikes. The controller 108 may compute from the number of kernel strikes how much grain is being lost during the harvesting operation.

In some embodiments, the controller or control system may detect the ground speed of the machine (e.g., via the sensor 114 or calculation) and a known width of the header (e.g., cutter head 18). From this, the controller may determine grain loss per unit area. Moreover, the loss in terms of unit cost per unit time can be determined from the cost per volume of grain (e.g., dollars per bushel or dollars per ton). Thus, in one embodiment, grain loss may be determined as a function of volume of grain loss per acre, machine speed in acres per hour, and unit cost per volume of grain.

In some embodiments, the cost of harvest determination may consider grain dockage cost. An amount of foreign material and broken grain may be sensed or detected by a grain quality sensor or the like. In one embodiment, the grain quality sensor may be a camera located on the clean grain elevator. Depending on the amount of foreign material and broken grain sensed by the grain quality sensor, a penalty cost may be enforced once the amount exceeds a predefined threshold. In some embodiments, an operator may define the dockage penalty cost and threshold. A third party such as the machine owner, farm owner, machine manufacturer, or machine distributor may predefine these values.

The cost of harvest determination may also consider a productivity factor, as shown in the algorithm above. Productivity may be characterized in an amount of area covered per unit of time. Here, a control system may determine a speed of the machine as described herein. The productivity factor may further consider an operating width of a header such as the cutter head 18 of the machine 10 in FIG. 1. By computing the ground speed and operating width, the productivity factor may be determined in acres per hour or some other unit of area per unit of time. Once the productivity factor is determined, the control system may evaluate the total cost of harvest.

Figure 2:
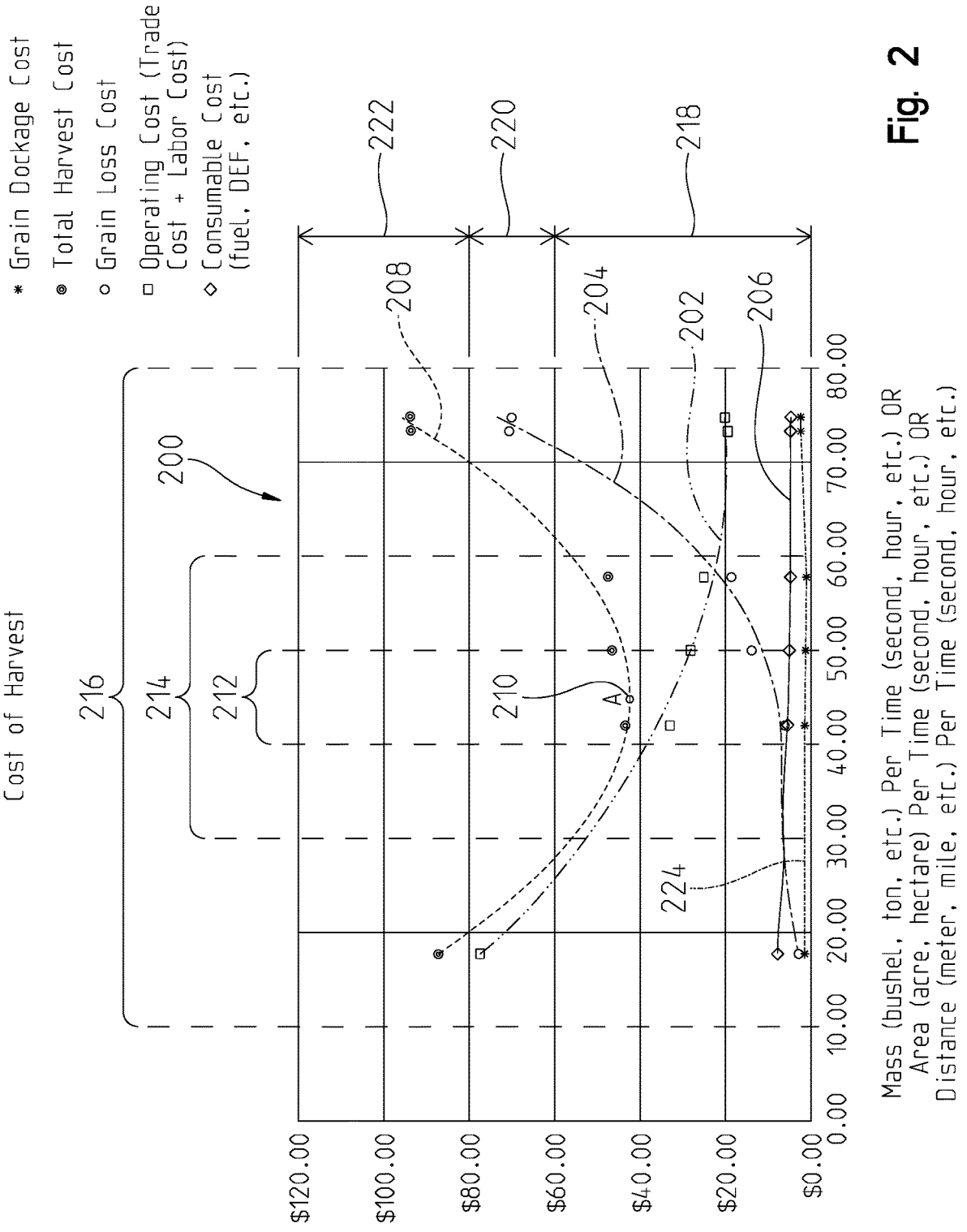
FIG. 2 is a graphical representation of a cost of harvest as a function of time.

Referring now to FIG. 2 of the present disclosure, the impact of these different factors in regards to cost of harvest is shown in a graph 200. In the graphical illustration of FIG. 2, the factors are illustrated as a function of feed rate (x-axis) and cost per field area or crop mass. For example, in one embodiment, the feed rate may be characterized as mass (i.e., bushel, ton, etc.) per unit time (i.e., second, hour, etc.). In another embodiment, the feed rate may be characterized as area (i.e., acre, hectare, etc.) per unit time (i.e., second, hour, etc.). In a further embodiment, feed rate may be characterized in terms of distance (i.e., meter, mile, etc.) per unit time (i.e., second, hour, etc.). In some embodiments, the cost on the y-axis of the graph 200 may be characterized in terms of cost per field area (i.e., acre, hectare) or cost per crop mass (i.e., bushels, tons, etc.).

In FIG. 2, the graph 200 may include a number of curves. For example, a first curve 202 may be representative of operating cost. The operating cost curve 202, for example, may take into account factors such as trade cost (e.g., depreciation of the machine) and labor cost (e.g., the cost of hiring someone to operate the machine). As shown, the operating cost curve 202 outputs a higher cost at a lower feed rate and a lower cost at a greater feed rate.

The graph 200 may include a second curve 204 representing a grain loss cost. As described above, grain loss is related to the amount of grain that unintentionally escapes the machine during harvest. As shown in FIG. 2, the grain loss cost is relatively low at a low feed rate, but it increases significantly as the feed rate increases. In this way, the effect of grain loss is negatively proportional to the effect of operating cost in regards to the overall cost of harvest.

In FIG. 2, a third curve 206 is shown representing a consumable cost. As described above the consumable cost may include fuel usage, DEF usage, hydraulic fluid etc. Consumable costs may also include grease or other consumable that the machine may use periodically. This is a cost that may be taken into account when determining the cost of harvest, but it generally is less of a factor than operating cost and grain loss cost. In FIG. 2, the third curve 206 may have a negative slope such that its cost per acre, for example, is greater at a lower feed rate compared to at a higher feed rate.

As shown in FIG. 2, a fourth curve 208 representing the total cost of harvest is shown. In this embodiment, the cost of harvest curve 208 is shaped as a bell curve having a minimum point 210 along the curve. For purposes of this embodiment, the minimum point 210 may be referred to as an ideal or optimal cost of harvest. Here, the machine is being controlled to achieve the optimal cost of harvest possible. As the operator or manager changes the operation of the machine, the cost of harvest may also change to different points along the fourth curve 208. Thus, in the present disclosure, it is desirable to determine the cost of harvest in real-time and provide an output to the operator or manager or other party who is controlling the machine.

As also shown in FIG. 2, a fifth curve 224 representing a grain dockage cost or penalty cost is shown. In this embodiment, the fifth curve 224 representing grain dockage cost may be substantially linear and have less of an impact on the cost of harvest determination compared to the other costs.

In one embodiment, the machine may include an onboard display. This may include a dashboard, a computer display, or the like. In any event, the onboard display may be in communication with the control system such that the control system is able to communicate the total cost of harvest to the onboard display. In one embodiment, the total cost of harvest may be communicated to the onboard display in the form of a numerical value. In another embodiment, the total cost of harvest may be displayed on the onboard display as a color code. For example, an output of a first color such as green may indicate the machine is operating within an ideal range or threshold for cost of harvest. Alternatively, a second color such as yellow may be indicative of a less ideal or optimal cost of harvest. Moreover, a third color such as red may be indicative of a least optimal or undesirable cost of harvest. The color codes may change as the machine operation changes.

In FIG. 2, for example, the onboard display may output the first color when the cost of harvest value is within a first range of feed rate values identified by 212. The onboard display may output the second color when the cost of harvest is outside of the first range 212 but within a second range 214 of feed rate values. The onboard display may show the third color when the cost of harvest is inside a third range 216 of feed rate values but outside the first range 212 and second range 214.

In some embodiments, the control system may display the first color when the cost of harvest within the first range 212 of feed rate values and within a first range 218 of cost values. In addition, the second color may be displayed when the cost of harvest value is within the second range 214 of feed rate values but outside the first range 212 of feed rate values, and further when the cost of harvest value is within a first range 218 or second range 220 of cost values. On the other hand, the third color may be displayed when the cost of harvest value is within the third range 216 of feed rate values and outside the first and second ranges of feed rate values, and further when it is within a third range 222 of cost values.

In several embodiments, the ideal or optimal range may be within a certain range of feed rate values, whereas the less ideal or optimal range is defined as a factor (e.g., 10-30%) outside of the optimal range.

In other embodiments, a relative scale may be used to display the cost of harvest value in real-time to the operator. For example, the control system may indicate how a change in operation may hurt or improve the cost of harvest. In some embodiments, the control system may output a recommendation to the onboard display to communicate one or more ways in which the operator may change the machine operation to improve the cost of harvest value.

In yet other embodiments, the control system may display a similar graph such as that in FIG. 2 on the onboard display so that the operator can monitor how machine operation is affecting the overall cost of harvest. For instance, an icon or arrow may appear on the graph to show what the actual cost of harvest is relative to the total cost of harvest curve 208. This would enable an operator of the machine to make adjustments to alter the cost of harvest.

While the aforementioned embodiments described how the control system may communicate the cost of harvest to an onboard display in a cab of the machine, the present disclosure is not limited to such an embodiment. Instead, the control system may transmit the cost of harvest value in real-time to a manager or other party in a remote location. This may be sent to a cell phone, laptop, remote control system, etc.

The control system may also store cost of harvest values on a hard drive or other storage system. This may enable an operator, manager, machine owner, etc. to retrieve stored date over time and compare the data. Similar data may be accumulated on other machines within a given fleet of machines such that it can be compared to determine which machines were operating the most effectively based on the cost of harvest.

In another embodiment of the present disclosure, the control of the machine to achieve an ideal or optimal cost of living may be achieved via an automated control system. In some embodiments, the agricultural machine may be operated in a number of different control modes. For example, the machine may be operated in a harvest mode, a performance mode, an economy mode, etc. The automated control system may be programmed to control the machine to achieve a desired cost of harvest when operating in one of these modes. An operator, manager, or third person may select the operating mode and this command is communicated to the automated control system. Depending on the control mode selected, the automated control system may control the operation of the machine to achieve an optimal cost of harvest.

In some embodiments, the automated control of the machine to achieve an optimal cost of harvest may take the form of a closed loop control. Here, the control system may receive information or inputs from various sources, determine or calculate the cost of harvest in real-time, and make further determinations as to how to control the machine differently to improve the cost of harvest.

Figure 3:
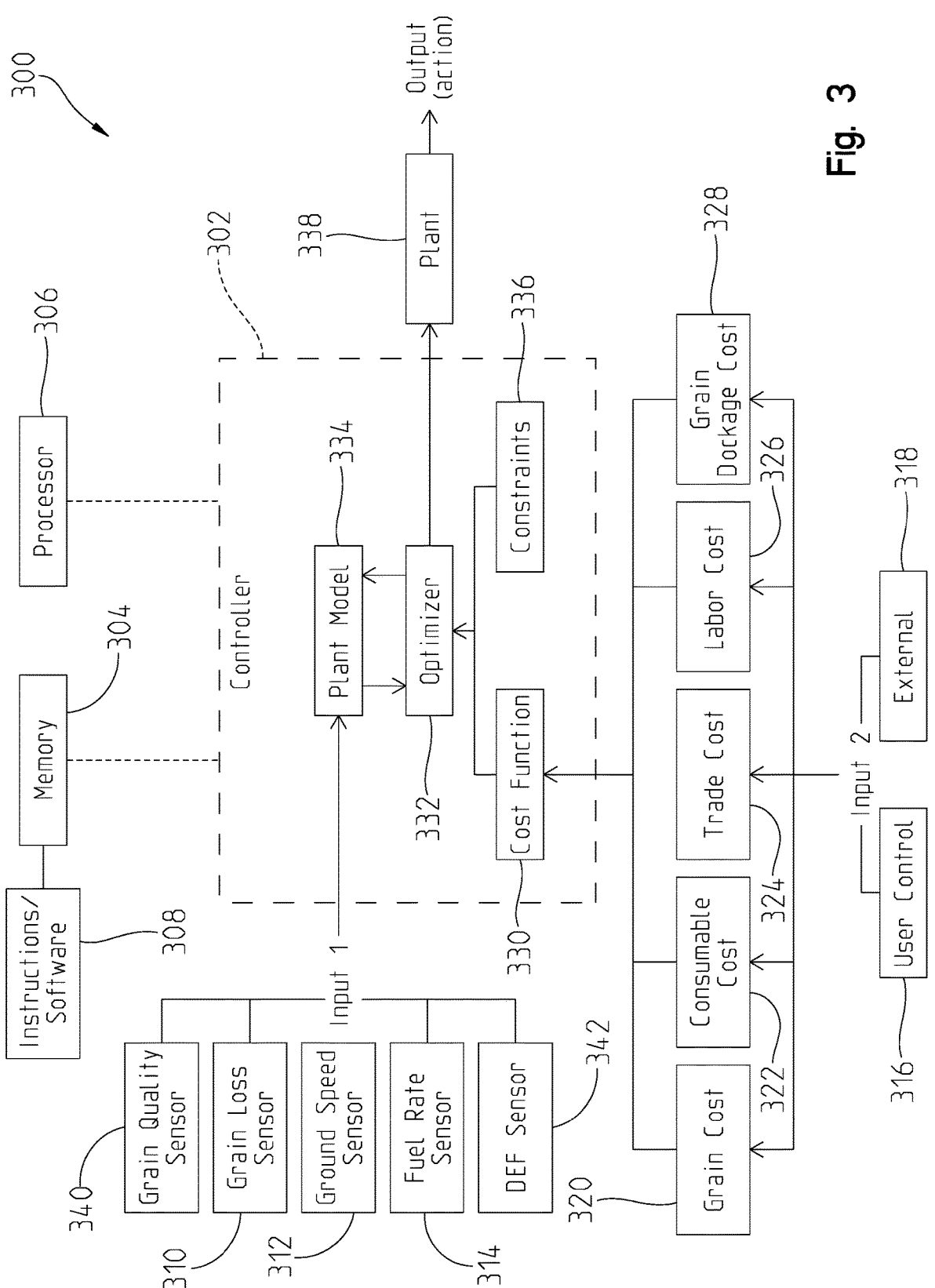
FIG. 3 is a diagram of a control system of an agricultural machine for controlling the cost of harvest.

Referring to FIG. 3, an embodiment of an automated control system 300 is shown for controlling the output of an agricultural machine such as a combine to achieve an optimal cost of harvest. In this embodiment, the system 300 may include a model-based or predictive controller 302. Other types of controllers may be used in other embodiments. In this embodiment, the controller 302 may include a memory unit 304 and a processor 306. The memory unit 304 may store a set of instructions or software 308 which may be executable by the processor 306. In one embodiment, the memory unit 304 may comprise a non-transitory storage medium as is known to one skilled in the art. In yet another embodiment, the memory unit 304 may comprise one or more non-transitory machine-readable storage media. In some embodiments, the memory unit may comprise random access memory (RAM) such as SRAM or DRAM. In other embodiments, the memory unit 304 may comprise read only memory (ROM) such as MROM, PROM, EPROM, EEPROM, etc. The memory unit may include any other type of memory known to the skilled artisan.

The system 300 may be arranged such that the controller 302 is configured to receive one or more inputs of information. In one embodiment, the controller 302 may receive information via a first input in the form of sensor data. This may include, for example, grain loss data as detected by a grain loss sensor 310. A ground speed sensor 312 may detect ground speed of the machine and communicate this to the controller 302 via the first input (Input 1). Moreover, a fuel rate sensor 314 may detect an integrated rate of fuel going to the engine of the machine. In other embodiments, a grain quality sensor 340 may detect the amount of foreign material and broken grain and output this data to the controller 302. In yet other embodiments, a DEF sensor 342 may detect the DEF rate consumption and communicate a consumption value to the controller 302. Further, there may be additional sensors for detecting other factors which may be communicated to the controller via the first input.

The controller 302 may also receive information via a second input (Input 2) which may come from a machine operator, a manager, a farm owner, machine owner, factory, dealership, etc. Some information may be communicated to the controller 302 via an operator control 316, while other information may be provided via an external source 318 such as from a remote control (e.g., mobile phone, laptop, etc.). Here, the controller 302 may receive information such as grain cost 320, consumable cost 322, trade cost 324, labor cost 326, and grain dockage cost 328. One or more of these costs may be provided by the operator via a user control 316 or an external source 318.

As the controller 302 receives the inputs from the user control 316 and external source 318, the controller 302 may determine the cost of harvest. In one embodiment, the controller 302 may determine the cost of harvest in terms of cost per acre or cost per bushel. Other units may be used for determining the cost of harvest. In any event, the controller 302 may receive information in real-time from the various inputs (including the sensors) and determine the total cost of harvest 330 in real-time. In one embodiment, the controller 302 may determine the cost of harvest as a function of the algorithm described above.

In some embodiments, the control system 300 of FIG. 3 may also include an optimizer 332 and a plant model 334. The plant model 334 may be a portion of the instructions or software 308 which is stored by the memory unit 304 and executed by the processor 306. The plant model 334 may be configured to draw a mathematical comparison or relationship between various inputs and outputs on the machine. For example, if grain loss is being modeled or controlled, the plant model may determine one or more relationships to different machine functions such as those which impact grain loss. In other words, the plant model 334 may compare the grain loss, which may be determined in accordance with the details provided herein, to the input settings of the machine and draw a mathematical relationship between the two.

In several embodiments, the optimizer 332 may receive the cost function 330 or value thereof. In turn, the optimizer 332 may reference the plant model 334 to determine which adjustments on the machine to make to further minimize the cost function 330, i.e., to adjust the cost function 330 to a desired or optimal level. In one embodiment, the cost function 330 may be a cost determined or calculated such as disclosed herein for the cost of harvest. The optimizer may also be designed as a portion of the instructions or software 308 stored in the memory unit 304 of the controller 302 and executed by the processor 306. In operation, the optimizer 332 seeks to minimize the cost function 330 by receiving input from or referencing the plant model 334 and evaluating what adjustments can be made to the machine performance. The optimizer 332 may receive one or more mathematical relationships from the plant model 334, determine how these relationships relate to one another and to the cost function, and then how to optimize input settings to reduce cost.

For purposes of this disclosure, "optimize" is a functional term executed by the controller 302 or some other device for bringing about a result that satisfies a predefined, desired condition or range set by the operator, a third party, or some other source. In some instances, the machine controller 302 may receive instructions from an operator, for example, and define the optimal settings to achieve any goal or purpose set forth in the instructions. In other embodiments, the instructions from the operator may define the optimal settings from which the optimizer 332 uses to adjust the cost function 330. Moreover, an "optimal" output may be a command or action taken by the control system 300, the controller 302, or some other device to control a machine setting to achieve the desired, predefined condition or range.

In one embodiment, the optimizer 332 and plant model 334 may be a set of routines, instructions, algorithms or software stored or accessed by the controller 302 for controlling machine operation to achieve an optimal cost of harvest. The optimizer 332 and plant model 334 may be automated processes performed by the controller 302.

Referring to FIG. 3, once the optimizer 332 determines what adjustments can be made to achieve the optimal cost of harvest, the controller 302 may execute one or more outputs 338. For example, the controller 302 may determine via the optimizer 332 to reduce machine speed or other setting on the machine to reduce grain loss. Other adjustments may be made to optimize labor cost 326, trade cost 324 and consumable cost 322. During operation, the optimizer 332 may determine the appropriate output adjustment and the controller 302 may execute the output 338.

Machine speed is not the only parameter or output 338 that can be adjusted by the controller 302. In other embodiments, the controller 302 may control or adjust the output of one or more of the machine heading, header height, header orientation, float pressure, auger and/or belt speed, reel height, reel fore/aft, reel speed, top auger speed, end fender speed, backshaft speed, CFS speed, feed drum and/or auger height, deck plate position or spacing, cornhead chopper on or off, feederhouse speed, cleaning fan speed, threshing speed, concave clearance, concave covers, separator covers, top cover van position, rethresher position, chaffer/sieve clearance, front chaffer clearance, discharge vane position, chopper speed, knifebank position, and spread width.

In some embodiments, the optimizer 332 or controller 302 may receive one or more inputs from a sensor, user control 316 or external source 318 for determining what the different output settings should be set at to achieve the optimal or desired cost of harvest. In several embodiments, the controller 302 or optimizer 332 may receive one or more input signals such as a measure of productivity, machine ground speed, grain feed rate, material other than grain ("MOG") feed rate, threshing grain loss, separating grain loss, cleaning grain loss, foreign material (e.g., a measure of an amount of unwanted material that makes its way into the combine's grain tank), unthreshed grain (e.g., a measure of an amount of unthreshed grain that makes its way into the combine's grain tank), damaged grain (e.g., a measure of damaged grain that makes its way into the combine's grain tank), tailings level, combine residue (i.e., spread width, spread uniformity, chop length, and windrow shape), front end equipment residue cut length (e.g., header such as cornhead, draper, etc.), front end equipment residue stubble height, power utilization (e.g., total, propulsion, functional, and unloading), fuel consumption, DEF (diesel exhaust fuel) consumption, and wheel slip. Thus, upon receiving one or more of these inputs, the control system 300 may be able to determine which of the appropriate outputs 338 to adjust to achieve the desired or optimal cost of harvest.

In FIG. 3, the controller 302 may also include an ability to receive and store constraints 336. The constraints 336 may be input by an operator, manager, machine owner, farm owner, or factory setting. In one example, a machine speed setting may be set such that regardless of what the optimizer 332 determines needs adjusted, machine speed cannot exceed or fall below a defined speed limit. Thus, if the operator does not want the machine to operate above 7 miles per hour but the optimizer 332 determines it is ideal for the machine to run at a harvest speed of 8 miles per hour, the controller 302 may only adjust the machine ground speed to 7 miles per hour based on the constraint.

In other embodiments, the constraints may provide a limit on engine utilization (i.e., not to exceed 100%) or grain loss (i.e., not exceed 1% grain loss). Other constraints may also be set including any one or more of the aforementioned outputs disclosed above. With the constraints, the optimizer 332 is designed or programmed such that it is unable to violate any of the predefined constraints. An operator or other party may set or adjust the constraints before or during a harvest operation. Thus, the controller 302 may continuously compare a desired output adjustment from the optimizer 332 to the constraints before determining the appropriate output 338.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A control system of an agricultural machine for performing a harvest operation, comprising:
    a controller comprising at least one memory unit and at least one processor;
    a fuel sensor disposed in communication with the controller, the fuel sensor configured to detect a rate of fuel being delivered to a power-generating device of the machine;

a grain loss sensor disposed in communication with the controller, the grain loss sensor configured to detect an amount of grain loss from the machine;
    a grain quality sensor configured to detect an amount of foreign material or broken grain in harvested material during the harvest operation; and
    at least one user control of a plurality of user controls disposed in communication with the controller;
    wherein, the at least one memory unit comprises a plurality of instructions stored thereon that, in response to execution by the at least one processor, causes the control system to:
        receive a plurality of inputs via the controller including the rate of fuel delivery from the fuel sensor, the amount of grain loss from the grain loss sensor, the amount of foreign material or broken grain from the grain quality sensor, and one or more preset cost values from the at least one user control, the one or more preset cost values including a grain dockage cost;
        determine, based on the detected amount of foreign material or broken grain being determined to satisfy a predetermined threshold, a penalty cost to be applied as the grain dockage cost; and
        process the plurality of inputs to determine a current cost of harvest value; and
        output a current cost of harvest value in real-time during the harvest operation.

2. The control system of claim 1, further comprising a display disposed in communication with the controller, wherein the current cost of harvest value is displayed in real-time during the harvest operation on the display.

3. The control system of claim 2, wherein the controller outputs the current cost of harvest value in a digital form on the display.

4. The control system of claim 2, wherein the controller outputs the current cost of harvest value in a graphical format with a current cost of harvest value displayed on a curve.

5. The control system of claim 2, further comprising at least a first color code and a second color code, the first color code indicative of the cost of harvest value being in a desirable range of cost of harvest values and the second color indicative of the cost of harvest value being in an undesirable range of cost of harvest values;
    wherein, the controller compares the current cost of harvest value to the desirable or undesirable range of cost of harvest values;
    wherein, the controller outputs the first color code or second color code on the display based on a comparison between the current cost of harvest value to the desirable or undesirable range.

6. The control system of claim 1, wherein, as the current cost of harvest value changes to a new cost of harvest value during the harvest operation, the controller continuously outputs to the display the new cost of harvest value.

7. The control system of claim 1, wherein the controller is configured to output the current cost of harvest value to a remote device.

8. The control system of claim 1, wherein the control system outputs the current cost of harvest value as a function of the rate of fuel delivery from the fuel sensor, the amount of grain loss from the grain loss sensor, the labor cost, the trade cost, the fuel cost, and the consumable cost.

9. The control system of claim 1, wherein the plurality of instructions comprises:

a plant model configured to compare the plurality of inputs to one or more machine functions and determine a relationship between the plurality of inputs and the one or more machine functions; and an optimizer configured to receive the current cost of harvest value and the relationship from the plant model, and produce an optimal output in the form of an adjustment to the one or more machine functions to reduce the current cost of harvest value;

wherein, the controller operably adjusts the one or more machine functions based on the optimal output.

10. The control system of claim 9, wherein the controller compares the optimal output to one or more operating constraints.

11. The control system of claim 9, wherein the controller operably adjusts one or more of machine speed, chaffer clearance, sieve clearance, cleaning fan speed, threshing speed, and threshing clearance.

12. The control system of claim 9, wherein the one or more preset cost values includes a labor cost, a trade cost, and a consumable cost.

13. A method of operating an agricultural machine to perform a harvest operation, comprising:

providing the machine with a controller, a fuel sensor, a grain loss sensor, and a ground speed sensor;

detecting via the fuel sensor a rate of fuel delivered to a power-generating device of the machine;

detecting via the grain loss sensor an amount of grain loss from the machine during the harvest operation;

detecting a machine ground speed via the ground speed sensor;

receiving, by the controller, a plurality of input data including the rate of fuel, the amount of grain loss, the machine ground speed, a labor cost for operating the machine, a trade cost of the machine, and a consumable cost for running the machine;

processing, by the controller, the plurality of input data to determine a current cost of harvest value during the harvest operation as a function of the rate of fuel, the amount of grain loss, the machine ground speed, the labor cost for operating the machine, the trade cost of the machine, the consumable cost for running the machine, and a productivity value of the machine, and as adjusted based on a grain dockage penalty cost associated with an amount of foreign material or broken seed in the harvested material; and controlling the machine to reduce the current cost of harvest value to satisfy a cost of harvest threshold.

14. The method of claim 13, wherein the controlling step comprises adjusting the machine ground speed until the current cost of harvest value satisfies the cost of harvest threshold.

15. The method of claim 13, further comprising outputting the current cost of harvest value to a display on the machine during the harvest operation.

16. The method of claim 13, further comprising receiving, via the controller, an instruction to adjust a machine function to reduce the current cost of harvest value;

wherein the machine function comprises at least one of machine ground speed, chaffer clearance, sieve clearance, cleaning fan speed, threshing speed, and threshing clearance.

17. The method of claim 16, further comprising:

receiving, via the controller, a limit on the machine function;

comparing the limit on the machine function to the instruction to adjust the machine function; and controlling the machine function to reduce the current cost of harvest value without violating the limit.

18. The method of claim 13, wherein the current cost of harvest value is calculated by the controller by:

determining a fuel cost as a function of the rate of fuel, a grain loss cost as a function of the amount of grain loss, and the productivity value as a function of an amount of area harvested over a period of time;

calculating a sum of the trade cost, labor cost, fuel cost, consumable cost, and grain loss cost; and dividing the sum by the productivity value.

19. One or more non-transitory machine-readable storage medium comprising a plurality of instructions stored thereon that, in response to execution by a control system on an agricultural machine, causes the control system to:

receive, by the control system, a plurality of input data including a rate of fuel delivery, an amount of grain loss, a machine ground speed, a labor cost for operating the machine, a trade cost of the machine, a grain dockage penalty cost based on a detected amount of foreign material or broken seed in crop harvested by the agricultural machine, and a consumable cost for running the machine;

processing, by the control system, the plurality of input data to determine a current cost of harvest value during the harvest operation;

display, by the control system, the current cost of harvest value on an operator display;

receive, by the control system, a control instruction from a user control to adjust one or more functions of the machine to control the current cost of harvest value to a new cost of harvest value; and adjust, by the control system, one or more functions of the machine in real-time to change the current cost of harvest value to the new cost of harvest value, where the new cost of harvest value is less than the current cost of harvest value.

20. The one or more non-transitory machine-readable storage medium of claim 19, wherein the one or more functions comprises machine ground speed, chaffer clearance, sieve clearance, cleaning fan speed, threshing speed, or threshing clearance.

* * * * *